(12) United States Patent
Parsons et al.

(10) Patent No.: US 12,110,993 B2
(45) Date of Patent: Oct. 8, 2024

(54) FITTINGS FOR SEALING A WIRE WITHIN A TUBE AND RELATED METHODS

(71) Applicant: White Knight Fluid Handling Inc., Kamas, UT (US)

(72) Inventors: Courtney Parsons, West Valley City, UT (US); Geoffrey White, Heber, UT (US); Tom M. Simmons, Kamas, UT (US)

(73) Assignee: White Knight Fluid Handling, Inc., Kamas, UT (US)

( * ) Notice: Subject to any disclaimer, the term of this patent is extended or adjusted under 35 U.S.C. 154(b) by 294 days.

(21) Appl. No.: 17/584,037

(22) Filed: Jan. 25, 2022

(65) Prior Publication Data
US 2022/0235885 A1 Jul. 28, 2022

Related U.S. Application Data

(60) Provisional application No. 63/141,243, filed on Jan. 25, 2021.

(51) Int. Cl.
*F16L 19/025* (2006.01)
*F16L 19/04* (2006.01)
(Continued)

(52) U.S. Cl.
CPC ........... *F16L 19/025* (2013.01); *F16L 19/041* (2013.01); *F16L 47/041* (2019.08); *H02G 3/06* (2013.01)

(58) Field of Classification Search
CPC ......... F16L 7/02; F16L 47/041; F16L 19/041; F16L 19/025; F16L 7/025; F16L 19/0286;
(Continued)

(56) References Cited

U.S. PATENT DOCUMENTS 3,900,221 A * 8/1975 Fouts ................. F16L 27/0861
285/179
3,922,011 A 11/1975 Walters
(Continued)

FOREIGN PATENT DOCUMENTS

KR 10-1097621 B1 12/2011
KR 10-2016-0005026 A 1/2016

OTHER PUBLICATIONS

Korean Notice of Reasons for Rejection for Korean Application No. 10-2022-0010398, dated Mar. 1, 2024, 15 pages with English translation.

*Primary Examiner* — Timothy J Thompson
*Assistant Examiner* — Michael F McAllister
(74) *Attorney, Agent, or Firm* — TraskBritt

(57) ABSTRACT

A fitting assembly may seal a wire within a tube to inhibit ingress of fluid outside the tube into the tube and into contact with the wire. The fitting assembly may optionally include a body and a nut, with a part of the nut received within the body. The nut may be threadedly connected to the body, such that threading and/or unthreading the nut translates the part of the nut within the body. Optionally, the nut may include a ring extension that is received within a ring cavity of the body, and an interfacing between the ring extension and the ring cavity may create a seal to inhibit leaking of the fluid past the seal. A method of sealing a wire within a tube may comprise positioning a tube with a wire therein within such a fitting assembly.

17 Claims, 2 Drawing Sheets

(51) Int. Cl.
*F16L 47/04* (2006.01)
*H02G 3/06* (2006.01)

(58) Field of Classification Search
CPC . F16L 19/04; F16L 33/22; F16L 19/02; F16L 47/06; F16L 33/223; F16L 19/0283; H02G 3/0675; H02G 3/06
USPC .......................................................... 174/481
See application file for complete search history.

(56) References Cited

U.S. PATENT DOCUMENTS

| | | | | |
|---|---|---|---|---|
| 4,007,953 | A | | 2/1977 | Powell |
| 5,332,271 | A | | 7/1994 | Grant et al. |
| 5,340,168 | A | * | 8/1994 | Barker ................. F16L 33/223 285/276 |
| 5,350,200 | A | * | 9/1994 | Peterson ............. F16L 19/0225 285/353 |
| 5,472,244 | A | | 12/1995 | Nishikata et al. |
| 5,498,036 | A | * | 3/1996 | Kingsford ........... F16L 19/0283 285/123.1 |
| 5,527,072 | A | | 6/1996 | Norkey |
| 6,089,621 | A | * | 7/2000 | Nishio ................... F16L 47/041 285/423 |
| 6,193,239 | B1 | * | 2/2001 | Fukano ................. F16L 33/223 285/354 |
| 6,402,206 | B1 | | 6/2002 | Simmons et al. |
| 6,896,299 | B1 | * | 5/2005 | Nishio ................... F16L 47/041 285/354 |
| 6,991,266 | B2 | * | 1/2006 | Nishio ................... F16L 47/041 285/423 |
| 8,152,205 | B2 | * | 4/2012 | Asakawa .............. F16L 19/061 285/342 |
| 9,797,532 | B2 | * | 10/2017 | Makino ............... F16L 19/0283 |
| 11,441,717 | B2 | * | 9/2022 | Fujii ..................... F16L 19/043 |
| 2008/0061551 | A1 | * | 3/2008 | Simmons .............. F16L 19/025 285/249 |
| 2009/0284004 | A1 | * | 11/2009 | Simmons .............. F16L 39/005 403/3 |
| 2016/0116096 | A1 | * | 4/2016 | Fujii ..................... F16L 47/041 285/386 |
| 2017/0299097 | A1 | * | 10/2017 | Fujii ..................... F16L 47/041 |
| 2017/0307118 | A1 | * | 10/2017 | Fujii ..................... F16L 47/041 |

\* cited by examiner

FITTINGS FOR SEALING A WIRE WITHIN A TUBE AND RELATED METHODS

CROSS-REFERENCE TO RELATED APPLICATION

This application claims the benefit under 35 U.S.C. § 119(e) of U.S. Provisional Patent Application Ser. No. 63/141,243, filed Jan. 25, 2021, the disclosure of which is hereby incorporated herein in its entirety by this reference.

TECHNICAL FIELD

The present disclosure relates to devices, assemblies, and methods for sealing a wire within a tube with a fitting.

BRIEF SUMMARY

In some embodiments, a fitting assembly may be configured to seal a wire within a tube to inhibit ingress of fluid outside the tube into the tube and into contact with the wire.

In further embodiments, methods for sealing a wire within a tube with a fitting assembly may comprise inhibiting ingress of fluid outside the tube into the tube and into contact with the wire with the fitting assembly.

DETAILED DESCRIPTION

Figure 1:
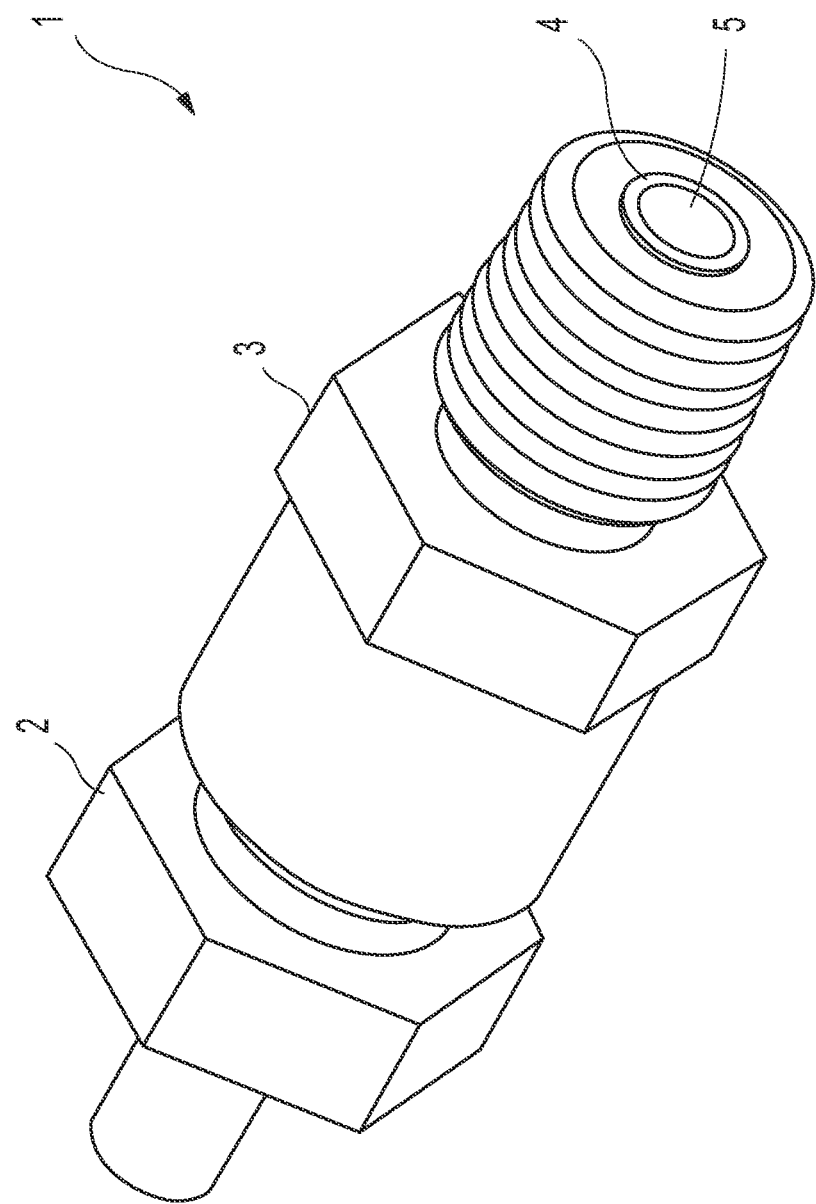
FIG. 1 is an isometric view of a fitting assembly that seals a wire within a tube to inhibit ingress of fluid outside the tube into the tube and into contact with the wire according to an embodiment of the present disclosure.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. Moreover, sharp angles that are illustrated may be rounded, and vice versa. The drawings are not necessarily to scale.

As used herein, the singular forms "a," "an," and "the" are intended to include the plural forms as well, unless the context clearly indicates otherwise.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

According to an embodiment of the present disclosure, a fitting assembly 1 may include a nut 2 and a body 3. A part of the nut 2 may be received within a cavity 11 of the body 3. The body 3 includes a bore 12. A tube 4 extends through the fitting assembly 1, including through the body 3 and partially within the nut 2. Part of a wire 5 extends through the tube 4. The exterior of the tube 4 can be exposed to liquid, such as part of a liquid pumping system. Ideally, the wire 5 is not exposed to liquid. In this way, the tube 4 seals the wire 5 within its lumen from the liquid which is on the outside of the tube 4. The fitting assembly 1 transitions the wire 5 from being outside the tube 4 to being inside of the tube 4 without ingress of the liquid at the end of the tube 4.

Figure 2:
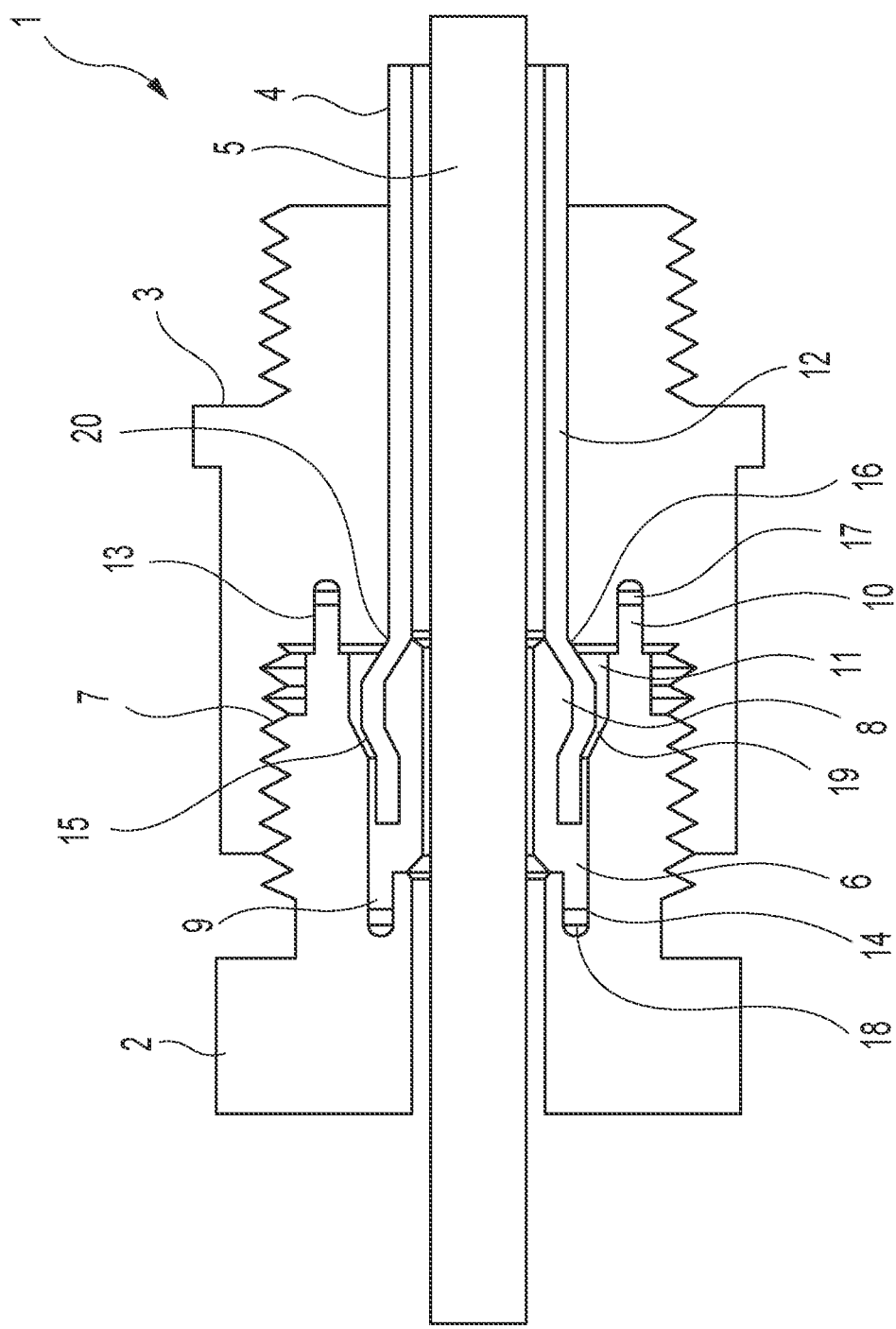
FIG. 2 is a cross-sectional view of the fitting assembly of FIG. 1.

As shown in FIG. 2, the fitting assembly 1 includes an insert 6. The insert 6 is located within the nut 2. The insert 6 includes a bulge 8. An end of the tube 4 is flared over the bulge 8 such that the tube 4 transitions from narrow (nominal inner diameter along its main-center length) to widened over the bulge 8 and then narrowed past the bulge 8 (but even if narrowed, still having a larger inner diameter than the nominal inner diameter along the main-center length of the tube 4). In this way, part of the insert 6 is inserted into the lumen of the tube 4.

Threading 7 between the nut 2 and the body 3 can tighten or loosen the connection with the tube 4 and can help seal at the end of the tube 4 to prevent ingress of liquid. Various features are provided to support multiple seals.

A seal 13 is provided by a ring extension 10 of the nut 2 extending into a ring cavity 17 within the body 3. Additionally or alternatively, a seal 14 is provided by a ring extension 9 extending into a ring cavity 18 within the nut 2. The ring extension 9 can fit tightly within the ring cavity 18 and elongate the engagement surfaces to provide a seal along a torturous and bent pathway to inhibit the passage of liquid there along.

The nut 2 includes a transition 19, which can be understood as a narrowing inner diameter along an angled section of the cavity 11 of the nut 2. Part of the tube 4 is pinched between the back end of the bulge 8 of the insert 6 and the angled surface of the transition 19 of the nut to create seal 15 to inhibit the passage of liquid there along.

The body 3 includes an inner corner 20, which in this embodiment defines an end of the bore 12. A part of the tube 4 is pinched between a front end of the bulge 8 of the insert 6 and the inner corner 20 of the body 3 to provide a seal 16 to inhibit the passage of liquid there along.

The wire 5 may carry a signal, such as a sensor signal, a command signal, or a power signal, amongst other options. The signal may be electrical. For example, the wire 5 may support a heater.

Except for the wire 5, some or all components may be formed from polymer. For example, the nut 2, the body 3, the insert 6, and the tube 4 may be formed from a polymer.

The fitting assembly 1 may be used for high purity material handling, such as for processor fabrication.

Accordingly, a method for sealing the wire 5 within the tube 4 with the fitting assembly 1 may comprise inhibiting ingress of fluid outside the tube 4 into the tube 4 and into contact with the wire 5 with the fitting assembly 1. The method may include positioning the tube 4 within the body 3 and at least a portion of the nut 2, a part of the nut 2 received within the body 3. The nut 2 may be threadedly connected to the body 3 while translating the part of the nut 2 within the body 3. The ring extension 10 of the nut 2 may be positioned into the ring cavity 17 of the body 3 to create the seal 13.

The method may further include positioning a portion of the tube 4 over the bulge 8 of the insert 6, the insert 6 at least partially located within the cavity 11 of the nut 2 and radially inside of each of the nut 2 and the body 3. The portion of the tube 4 may be squeezed between the narrowing inner diameter of the nut 2 and the bulge 8 of the insert 6 to form the seal 16. Additionally, a portion of the tube may be squeezed between the transition 19 of the nut 2 and the back end of the bulge 8 of the insert 6 to create the seal 15.

The method may include positioning the ring extension 9 of the insert 6 within the ring cavity 18 of the nut 2 to form the seal 14.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. The present disclosure is made using an embodiment to highlight various inventive aspects. Modifications can be made to the embodiment presented herein without departing from the scope of the invention. As such, the scope of the invention is not limited to the embodiment disclosed herein.

What is claimed is:

1. A fitting assembly, comprising:
   a body defining a first cavity, a bore extending from the first cavity to an end of the body, and a ring cavity extending from the first cavity towards a first end, the ring cavity including a ring shape;
   a nut comprising:
     a connecting portion defining a second cavity, the connection portion at least partially received in the first cavity and connected to the body such that the nut forms a first fluid-tight seal therewith; and
     a ring extension extending axially from the connecting portion into the ring cavity of the body to form a second fluid-tight seal; and
   a tube comprising a first portion within the bore and a second portion within the nut, the second portion of the tube contacting the nut to form a third fluid-tight seal.

2. The fitting assembly of claim 1, wherein the nut is threadedly connected to the body such that threading or unthreading the nut translates a portion of the nut within the first cavity of the body.

3. The fitting assembly of claim 1, further comprising an insert, the insert at least partially located within the second cavity of the nut.

4. The fitting assembly of claim 3, wherein the insert is radially inside of each of the nut and the body.

5. The fitting assembly of claim 3, wherein a portion of the insert comprises a bulge within a lumen of the tube, the bulge within the lumen of the tube squeezing the second portion of the tube against the nut to form the third fluid-tight seal.

6. The fitting assembly of claim 1, wherein the nut comprises a transition portion having a narrowing inner diameter that squeezes the second portion of the tube to form the fluid-tight seal.

7. The fitting assembly of claim 1, further comprising a wire extending through the bore of the body, and further extending through the second cavity and a bore of the nut.

8. A fitting assembly, comprising:
   a body defining a bore and a ring cavity, the ring cavity including a ring shape;
   a nut at least partially received within and connected to the body, the nut defining a cavity and comprising a ring extension protruding from an end thereof, the ring extension received within the ring cavity;
   an insert, at least a portion of the insert within the cavity of the nut; and
   a tube, an end portion of the tube within the nut,
   wherein the nut and the body form a fluid-tight seal within the tube and the ring extension received within the ring cavity form another fluid-tight seal.

9. The fitting assembly of claim 8, wherein the bore of the body and the cavity of the nut are concentrically aligned.

10. The fitting assembly of claim 8, wherein a portion of the insert extends into a lumen of the tube.

11. The fitting assembly of claim 10, wherein the lumen of the tube flares over a bulge of the insert and then narrows past the bulge.

12. The fitting assembly of claim 8, wherein an end of the insert pinches the tube between the end of the insert and an inner corner of the body.

13. The fitting assembly of claim 8, wherein the nut comprises a ring extension that is received within a ring cavity of the body to form an additional fluid-tight seal.

14. A method of assembling a fitting assembly, the method comprising:
   positioning a first portion of a tube within a body of the fitting assembly;
   positioning an insert within a cavity radially inside of a nut;
   positioning a second portion of the tube within a nut of the fitting assembly; and
   positioning the nut radially inside of the body to inhibit ingress of fluid outside the tube into the tube and into contact with a wire within the fitting assembly, wherein positioning the nut radially inside of the body includes positioning a ring extension of the nut into a ring cavity of the body to create a seal, the ring cavity including a ring shape.

15. The method of claim 14, wherein positioning the nut radially inside of the body comprises threadedly connecting the nut to the body while translating part of the nut within the body.

16. The method of claim 14, further comprising positioning an end portion of the tube over a bulge of an insert.

17. The method of claim 16, wherein positioning an insert radially inside of the nut comprises positioning a ring extension of the insert within a ring cavity of the nut to form a seal.

* * * * *